Feb. 10, 1970   E. A. MUIJDERMAN ET AL   3,494,674
HYDRODYNAMIC BEARING FOR AXIAL AND RADIAL LOADS
Filed March 5, 1968

INVENTORS·
EVERHARDUS A. MUIJDERMAN
GERRIT REMMERS

BY  *[signature]*
AGENT

United States Patent Office 3,494,674
Patented Feb. 10, 1970

3,494,674
HYDRODYNAMIC BEARING FOR AXIAL AND RADIAL LOADS
Everhardus Albertus Muijderman and Gerrit Remmers, Emmasingel, Eindhoven, Netherlands, assignors to U.S. Philips Corporation, New York, N.Y., a corporation of Delaware
Filed Mar. 5, 1968, Ser. No. 710,510
Claims priority, application Netherlands, Mar. 31, 1967, 6704588
Int. Cl. F16c 1/24, 7/04, 33/72
U.S. Cl. 308—9                2 Claims

ABSTRACT OF THE DISCLOSURE

A hydrodynamic bearing comprising a cylindrical shaft disposed within a complementary cylindrical bore. A first pattern of spiral grooves is located on one of the confronting cylindrical surfaces to define a bearing which supports radial loads. A second pattern of grooves is located on one of the confronting end faces of the shaft and bore to define an axial thrust bearing.

---

The invention relates to a hydrodynamic bearing for supporting axial and radial loads which comprises two relatively rotatable bearing members with a lubricant disposed therebetween. At least one of the cooperating supporting surfaces of the bearing members includes a pattern of shallow grooves so that during relative rotation between the bearing members the grooves will urge pressurized lubricant into the gap between the bearing members and thus provide a relatively low friction bearing support.

Compared with other types of hydrodynamic bearings, spiral groove bearings have a high load-carrying capacity and are subject to low frictional losses. Known spiral groove bearing assemblies which serve as both radial and thrust bearings generally comprise a shaft having a spherical or a conical portion disposed in a journal of complementary shape. The spherical spiral grove bearing assemblies are particularly suitable for carrying axial loads, but are less suitable for carrying high radial loads. The conical spiral groove bearing assemblies are well adapted for supporting both large axial and radial forces. However, when high axial loads are imposed on such a bearing there is a resistance to initial movement due to the clamping action occurring between the conical stub shaft and the conical journal. Additional problems with the spherical and conical bearings are the complexity and cost to manufacture.

The invention has for an object to provide a hydrodynamic spiral groove bearing which is particularly suited to support both a large radial and a large axial load.

A further object is to provide a combined radial and thrust bearing which has cylindrical bearing faces for supporting radial loads and an annular flat end face for supporting axial loads.

According to the invention, the bearing assembly includes a cylindrical stub shaft, supported in a journal housing; the latter of which comprises a housing having a cylindrical bore closed at one end which is complementary to the shape of the stub shaft. The cooperating cylindrical surfaces of the stub shaft and of the bearing housing provide surfaces for supporting radial loads, applied to either the shaft or the journal. One of these two supporting surfaces is provided with a pattern of helical shallow transport grooves which generates a high pressure in lubricant disposed in the gap between the shaft and the journal and also urges the lubricant towards the base of the bore between the shaft and the journal in response to relative rotation therebetween. The end face of the stub shaft and the base of the bore are oppositely disposed flat surfaces extending at right angles to the coincident center lines of the shaft and the bore. One of these flat surfaces is provided with a pattern of shallow grooves which also generates a pressure in the lubricant in response to relative rotation between the shaft and the journal. Hence, the cylindrical support surfaces constitute a bearing for supporting radial loads, while the base of the bore and the shaft end face constitute an axial spiral groove bearing for supporting axial loads.

The invention will be described in greater detail with reference to several embodiments thereof shown in the drawing, in which.

Figure 1:
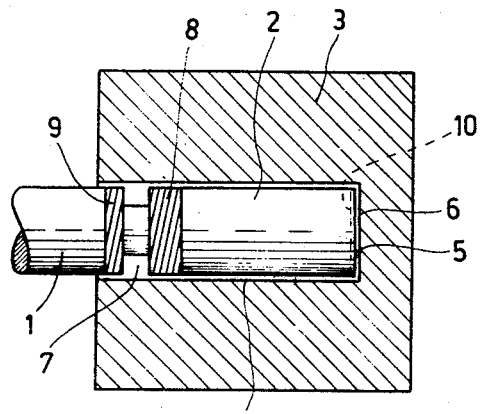
FIG. 1 shows a bearing according to the invention, which is particularly suited for grease lubrication.

Referring more specifically to the drawings, there is shown a stub portion 2 of the shaft 1 disposed in a cylindrical bore 4 of a journal housing 3. The radially extending end face 5 of the stub portion and the corresponding base surface 6 of the bore in the bearing housing are substantially flat. The stub portion 2 is provided with an annular chamber 7 which is surrounded by the cylindrical wall surface of the bore. The annular chamber 7 is adapted to be supplied with a grease lubricant. A pattern of shallow helical transport grooves 8 are located on the inner cylindrical shaft surface which abuts the supply chamber 7. Another pattern of grooves 9 are located on the cylindrical shaft surface which abuts the supply chamber 7. This latter described groove pattern maintains the lubricant within the bore 4 by urging the lubricant inwardly in response to the relative rotation between the shaft 1 and the journal 3.

Figure 3:
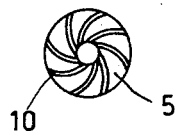
FIG. 3 shows a groove configuration for the radially disposed bearing faces.

The end face 5 of the shaft is also provided with a pattern of grooves 10 for generating a hydrostatic fluid pressure between the abuting surfaces 5 and 6. The groove configurations are preferably in the form of logarithmic spirals, as shown in FIG. 3.

Upon rotation of the shaft 1 relative to the journal housing 3, the grease in the supply chamber 7 will be urged towards the cylindrical wall 4 of the bearing housing due to the centrifugal force. The sealing grooves 9 prevent the grease from leaking to the exterior of the housing 3. The grease from the supply chamber under the impetus of the centrifugal force is moved into the ends of the transport grooves 8 which abut the supply chamber. The grease is then urged towards the base 6 of the bore 4 in the bearing housing until the bearing is completely filled with grease. As a result, the annular gap between the stub shaft and the cylindrical wall 4 always contains grease and thus serves as a hydrodynamic radial bearing. Some of the grease is transported to the space between the end faces of the shaft and the base 6 of the bore. In response to relative rotation, the end face and the bore act as a flat axial spiral groove bearing which has a high load-carrying capacity and a low frictional loss.

The groove patterns 8, 9 and 10 may be provided in the bore wall surfaces of the bearing housing instead of in the surfaces of the stub shaft. This positioning of the grooves will not have a deleterious effect on the operation of the bearing. The depth of the grooves depends upon the dimensions of the bearing. A groove depth lying between 5 microns and 50 microns is typical in most instances. Any arbitrary viscous medium, such as oil, grease, air, water, etc. are suitable lubricants.

Figure 2:
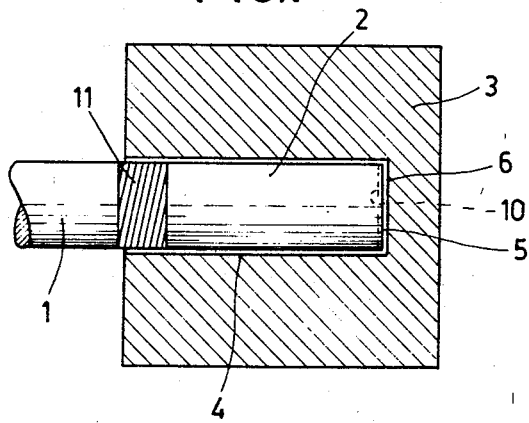
FIG. 2 shows an embodiment according to the invention which is suitable for oil lubrication.

FIG. 2 shows an embodiment of the bearing which is best suited for oil lubrication. In this case, the stub shaft 1 is again provided with transport grooves 11 which in this embodiment also serve as sealing grooves. These grooves cover an area of the shaft which extends slightly to the exterior of the bore in one direction and extends substantially into the bore in the opposite direction. Thus, oil contacting the shaft will be readily urged by the transport grooves towards the base 6 of the journal housing. A spiral groove pattern 10 is also located on the end face 5 of the shaft, which cooperates with the base 6 to provide a thrust bearing. The operation of the bearing of FIG. 2 is substantially the same as the bearing of FIG. 1.

FIG. 3 shows a groove pattern for the axial bearing. The grooves are in the shape of logarithmic spirals so that the pressure build-up effect in the lubricant is a maximum. However, a satisfactory effect is also obtained with grooves having other spiral configurations or with a fishbone-shaped groove pattern. It should be noted that the bearing assemblies described herein are suitable to be used for a single direction of rotation of the shaft relative to the journal. The direction of the groove patterns may be reversed and thus the direction of bearing rotation may be reversed. However, a particular bearing assembly can be rotated in one direction only.

The above cited embodiments are intended as exemplary only, and while we have described our invention with a specific application and embodiment thereof, other modifications will be apparent to those skilled in the art without departing from the spirit and scope of the invention.

What is claimed is:

1. A hydrodynamic bearing having means for supporting both a radial and an axial load comprising a journal housing having a cylindrical bore, said bore being open at one end and closed at the other end by a substantially flat radially extending surface, a cylindrical shaft having a flat end surface, said shaft being disposed within said bore and in confronting relationship with said bore surfaces, said shaft flat end surface confronting the closed end surface of said bore; wherein at least one of the confronting cylindrical surfaces of said cylindrical bore and said cylindrical shaft includes a first plurality of grooves therein for urging a lubricant into the space between the wall of said cylindrical bore and said shaft in response to relative rotation therebetween, so as to provide radial support for the shaft, said first plurality of grooves being located adjacent the open end of said bore and extending interiorly thereof; and wherein at least one of said confronting flat end surfaces includes a groove pattern therein for pressurizing a lubricant located between said confronting flat end surfaces in response to relative rotation between said shaft and said journal housing, so as to provide axial support for the shaft.

2. A hydrodynamic bearing comprising a journal housing having a cylindrical bore, said bore being open at one end and closed at the other end by a substantially flat radially extending surface, a cylindrical shaft having a flat end surface disposed within said bore and in confronting relationship with said bore surfaces, said shaft flat end surface confronting the closed end surface of said bore, a circumferential annular chamber formed in said cylindrical shaft said chamber being located on a portion of said shaft disposed interiorly of said bore, a first plurality of grooves on one of the confronting cylindrical surfaces interposed between said open end of said bore and said chamber, and at least one of said confronting cylindrical surfaces further including a second plurality of grooves for urging a lubricant inwardly along said space between the wall of said bore and said shaft in response to relative rotation therebetween, the second plurality of grooves being located adjacent said chamber and interposed between said chamber and said end surface of said bore, at least one of said confronting flat end surfaces including a groove pattern therein for pressurizing a lubricant located therebetween in response to relative rotation between the shaft and the journal housing.

References Cited

UNITED STATES PATENTS 2,916,642  12/1959  Macks.
3,282,633  11/1966  Moors _____ 308—9

MARTIN P. SCHWADRON, Primary Examiner

U.S. Cl. X.R.

308—36.3